US011089104B2

(12) United States Patent
Garcia et al.

(10) Patent No.: US 11,089,104 B2
(45) Date of Patent: Aug. 10, 2021

(54) ACCESS TO SERVICES PROVIDED BY A DISTRIBUTED DATA STORAGE SYSTEM

(71) Applicant: NOKIA TECHNOLOGIES OY, Espoo (FI)

(72) Inventors: Marie-France Garcia, Lannion (FR); Christine Couloigner, Lannion (FR); Patrice Mouzer, Lannion (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/339,905

(22) PCT Filed: Sep. 29, 2017

(86) PCT No.: PCT/EP2017/074897
§ 371 (c)(1),
(2) Date: Apr. 5, 2019

(87) PCT Pub. No.: WO2018/065334
PCT Pub. Date: Apr. 12, 2018

(65) Prior Publication Data
US 2020/0053153 A1    Feb. 13, 2020

(30) Foreign Application Priority Data
Oct. 7, 2016 (EP) .................. 16306326

(51) Int. Cl.
*G06F 15/16* (2006.01)
*H04L 29/08* (2006.01)
*G06F 9/50* (2006.01)

(52) U.S. Cl.
CPC ........ *H04L 67/1097* (2013.01); *G06F 9/5027* (2013.01); *H04L 67/1021* (2013.01);
(Continued)

(58) Field of Classification Search
CPC . H04L 67/1097; H04L 67/1021; H04L 67/16; H04L 67/18; H04L 67/306; H04L 67/34; G06F 9/5027
(Continued)

(56) References Cited

U.S. PATENT DOCUMENTS 6,332,198 B1 * 12/2001 Simons ..................... G06F 1/14
370/217
7,181,211 B1    2/2007 Phan-Anh
(Continued)

FOREIGN PATENT DOCUMENTS

CN        1771712 A    5/2006
CN      101650741 A    2/2010
(Continued)

OTHER PUBLICATIONS

International Search Report and Written Opinion for Application No. PCT/EP2017/074897 dated Nov. 9, 2017, 10 pages.
(Continued)

*Primary Examiner* — Alicia Baturay
(74) *Attorney, Agent, or Firm* — Alston & Bird LLP

(57) ABSTRACT

An apparatus and method are provided that are configured to:
support access, by a network function referred to as a client function, to services provided by a distributed data storage system, via at least one service end point allocated to client function by a network function referred to as a service discovery function based on at least one of: client function requirements, or conditions at the distributed data storage system.

23 Claims, 4 Drawing Sheets

Figure 1:
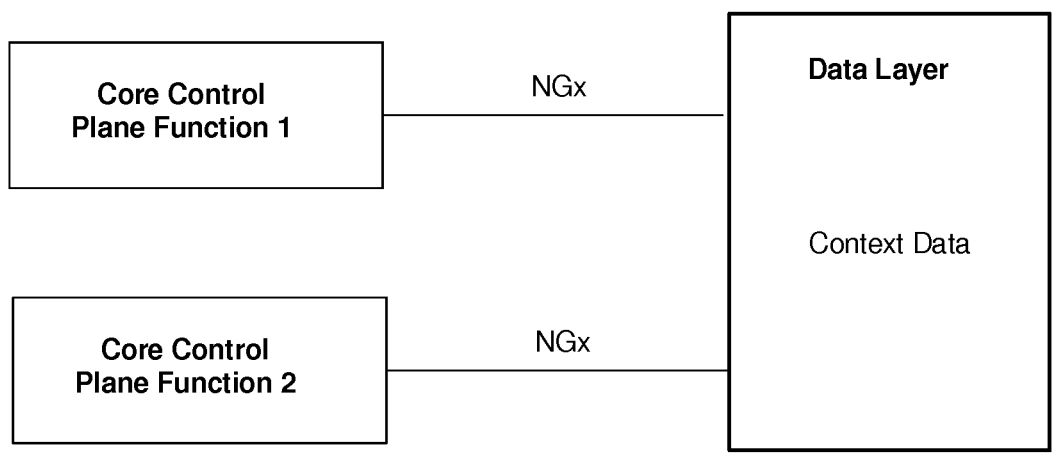

(52) U.S. Cl.
CPC .............. *H04L 67/16* (2013.01); *H04L 67/18* (2013.01); *H04L 67/306* (2013.01); *H04L 67/34* (2013.01)

(58) Field of Classification Search
USPC ........................................................ 709/219
See application file for complete search history.

(56) References Cited

U.S. PATENT DOCUMENTS

| | | | |
|---|---|---|---|
| 7,843,843 B1 | 11/2010 | Papp, III et al. | |
| 9,219,931 B2* | 12/2015 | Xu | H04N 21/85406 |
| 9,635,124 B2* | 4/2017 | Profit | H04L 67/2861 |
| 9,722,873 B2* | 8/2017 | Zhu | G06F 16/27 |
| 9,930,025 B2* | 3/2018 | Oberheide | H04L 63/1425 |
| 10,205,506 B2* | 2/2019 | Mogi | H04B 7/155 |
| 10,264,515 B2* | 4/2019 | Horn | H04L 67/16 |
| 10,332,180 B2* | 6/2019 | Kozat | G06Q 30/0623 |
| 10,493,784 B2* | 12/2019 | Yamada | B41J 2/51 |
| 10,594,677 B2* | 3/2020 | Oberheide | G06F 9/00 |
| 10,785,145 B2* | 9/2020 | Kulkarni | H04L 45/38 |
| 10,938,583 B2* | 3/2021 | Qiao | H04L 12/1435 |
| 10,951,427 B2* | 3/2021 | Qiao | H04L 12/1435 |
| 2006/0294227 A1 | 12/2006 | Goto et al. | |
| 2007/0033261 A1 | 2/2007 | Wagner et al. | |
| 2007/0106754 A1* | 5/2007 | Moore | G06F 21/604 709/217 |
| 2008/0040151 A1* | 2/2008 | Moore | G16H 10/60 705/2 |
| 2012/0246301 A1 | 9/2012 | Vyrros et al. | |
| 2014/0043993 A1 | 2/2014 | Sirotkin et al. | |
| 2015/0117430 A1 | 4/2015 | Zhuang et al. | |
| 2015/0334749 A1* | 11/2015 | Goto | H04W 76/14 370/254 |
| 2016/0004820 A1* | 1/2016 | Moore | H04L 63/1441 705/3 |
| 2016/0127333 A1 | 5/2016 | Sood et al. | |
| 2016/0183168 A1 | 6/2016 | Horn et al. | |
| 2016/0192191 A1 | 6/2016 | Lee et al. | |
| 2019/0116521 A1* | 4/2019 | Qiao | H04W 28/06 |
| 2020/0053153 A1* | 2/2020 | Garcia | H04L 67/18 |

FOREIGN PATENT DOCUMENTS

| | | |
|---|---|---|
| CN | 103348633 A | 10/2013 |
| CN | 103891355 A | 6/2014 |
| CN | 105453621 A | 3/2016 |
| CN | 105530620 A | 4/2016 |
| CN | 105577637 A | 5/2016 |
| WO | WO 2011/159093 A2 | 12/2011 |

OTHER PUBLICATIONS

Extended European Search Report for Application No. EP 16 30 6326 dated Apr. 11, 2017, 7 pages.
Office Action for Indian Patent Application No. 201947014878 dated Jan. 29, 2021, 6 pages.
Office Action for European Application No. 16306326.6 dated Mar. 26, 2021, 5 pages.
Office Action for Chinese Application No. 2017800710568 dated Apr. 21, 2021, 20 pages.

* cited by examiner

ACCESS TO SERVICES PROVIDED BY A DISTRIBUTED DATA STORAGE SYSTEM

CROSS-REFERENCE TO RELATED APPLICATIONS

The present application is a national phase entry of International Application No. PCT/EP2017/074897, filed Sep. 29, 2017, which claims priority to EP Application No. 16306326.6, filed Oct. 7, 2016, all of which is incorporated herein by reference in their entirety.

The present invention generally relates to communication networks and systems, in particular mobile communication networks and systems.

Descriptions of such networks and systems can be found in the literature, such as in particular in Technical Specifications published by standardization bodies such as for example 3GPP (3$^{rd}$ Generation Partnership Project).

In general, in such systems, a terminal (also called User Equipment UE) has access to a network providing communication services. The network generally comprises a Core Network accessed via an Access Network.

Different systems of different generations have been standardized over time, for example EPS (Evolved Packet System) for 4G generation.

A Next Generation system (also called 5G), is currently being standardized. An architecture for such Next Generation system is currently being studied, in particular in 3GPP TR 23.799.

In general, a network comprises various network entities also called Network Functions. For example, in 3GPP TR 23.799, a Network Function is defined as a 3GPP adopted or 3GPP defined processing function in a network, which has defined functional behaviour and 3GPP defined interfaces; a Network Function can be implemented either as a network element on a dedicated hardware, or as a software instance running on a dedicated hardware, or as a virtualised function instantiated on an appropriate platform, e.g. on a cloud infrastructure.

In 3GPP TR 23.799, a solution for interaction of control plane Network Functions (e.g. Core Control Function CCF) via a Data Layer has been proposed, whereby a Network Function can create, update, delete data in the Data Layer, and other Network Functions can have access to these data, or subscribe to notification upon change of these data, via the Data Layer. A simplified model for interconnection of Core Control Functions via a Data Layer is recalled in FIG. 1 taken from 3GPP TR 23.799. The stored data may include context data (e.g. Mobility Management context, Session Management context, . . . etc.).

Such Data Layer thus brings several advantages, in particular it supports flexible interconnection between control plane network functions, e.g. avoiding functional and signaling impact to unrelated network functions for a given interaction.

As recognized by the inventors and as will be described with more detail, there is a need for an optimized solution for access to services provided by such Data Layer, particularly in view of the high level of performances required for Next Generation (or 5G) systems. More generally there is a need to improve such systems, such as Next Generation (or 5G) systems.

Embodiments of the present invention in particular address such needs.

These and other objects are achieved, in one aspect, by an entity referred to as Client, configured to:

support access to services provided by a distributed data storage system, via at least one service end point allocated to the Client by an entity referred to as Service Discovery Function based on at least one of: Client requirements, and conditions at the distributed data storage system.

These and other objects are achieved, in another aspect, by an entity referred to as Service Discovery Function, configured to:

support access by an entity referred to as Client, to services provided by a distributed data storage system, via at least one service end point allocated to the Client by the Service Discovery Function based on at least one of: Client requirements, and conditions at the distributed data storage system.

These and other objects are achieved, in another aspect, by a method for access to services provided by a distributed data storage system, comprising at least one step performed by at least one of the thus configured entities.

Figure 2:
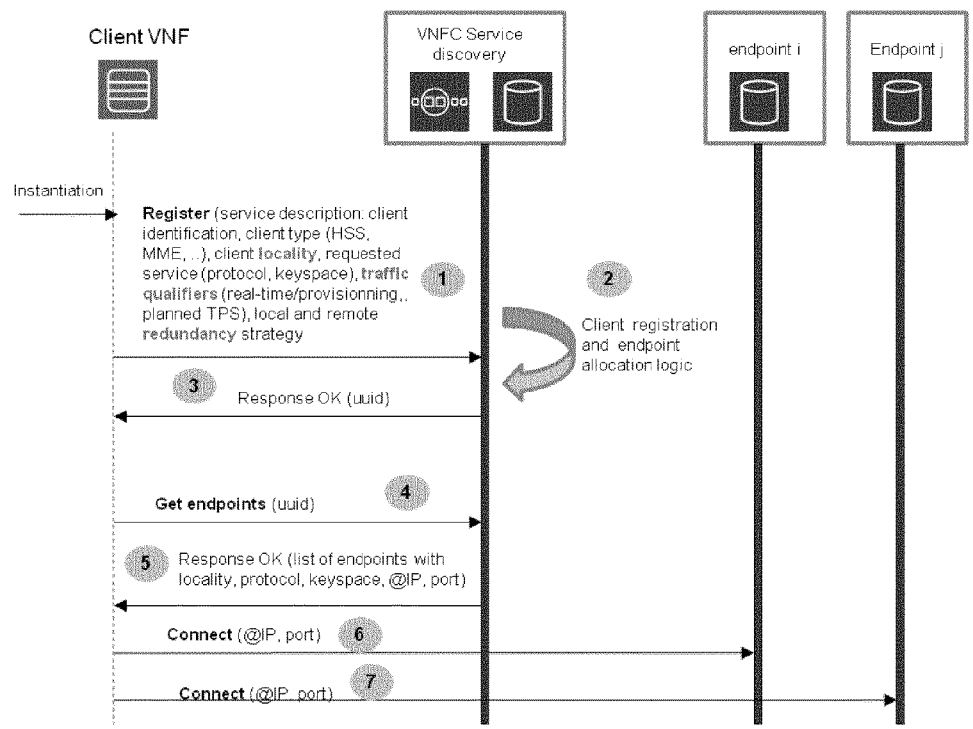
Figure 3:
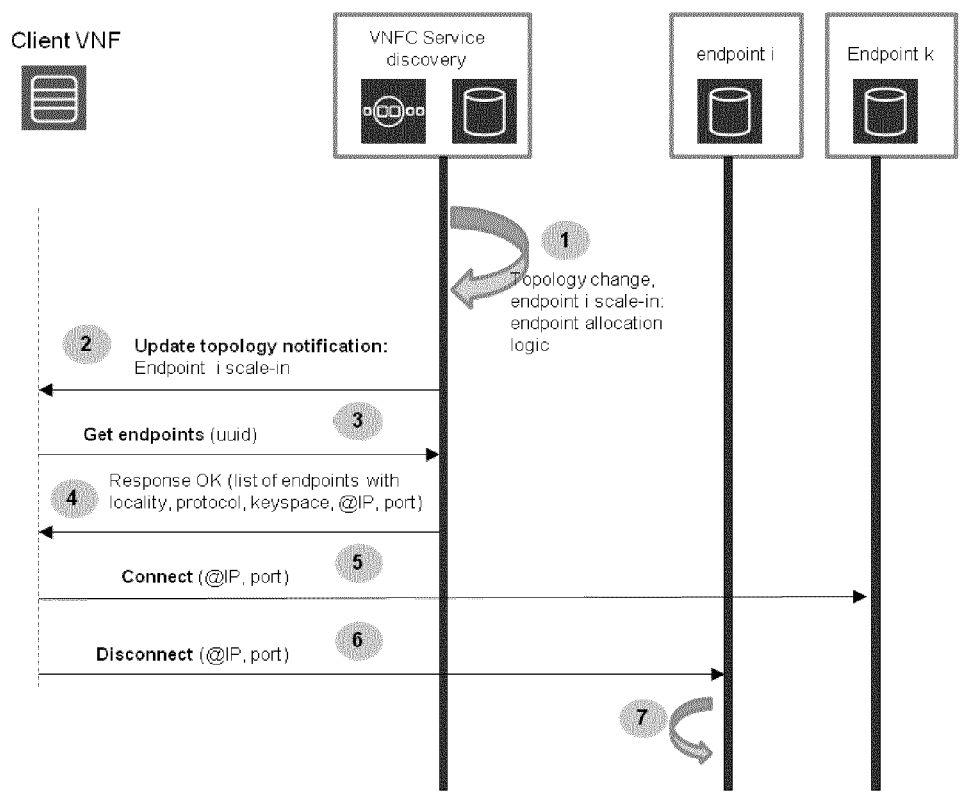
Figure 4:
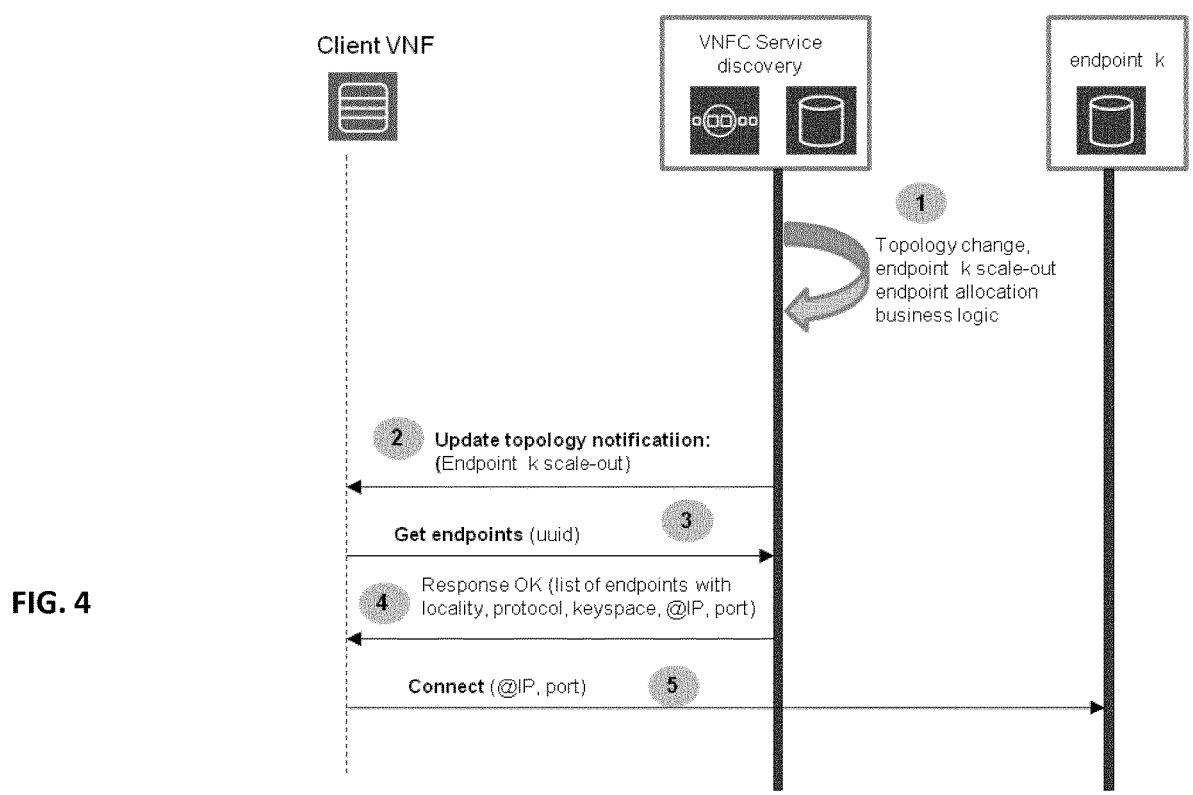

Some embodiments of apparatus and/or methods in accordance with embodiments of the present invention are now described, by way of example only, and with reference to the accompanying drawings, in which:

FIG. 1 is intended to recall a simplified model for Data Layer interconnection model for Next Generation system architecture, FIG. 2 is intended to illustrate in a simplified way an example of workflow related to a first procedure for access to services provided by a Data Layer, according to embodiments of the invention, FIG. 3 is intended to illustrate in a simplified way an example of workflow related to a second procedure for access to services provided by a Data Layer, according to embodiments of the invention, FIG. 4 is intended to illustrate in a simplified way an example of workflow related to a third procedure for access to services provided by a Data Layer, according to embodiments of the invention.

DESCRIPTION OF VARIOUS ASPECTS AND/OR EMBODIMENTS OF THE INVENTION

As indicated above, 3GPP is currently standardizing the so called Next Generation Core Network which will be the core network for 5G networks. 3GPP SA2 is documenting the results in TR 23.799. In this framework it has been proposed that data (which may include subscriber, session, mobility, policy, operations data) in the 5G core networks is stored in data plane—the so called Shared Data Layer (SDL).

The SDL enables a flexible cloud-optimized network design with simplified stateless VNFs (Virtualized Network Functions), accessing the Shared Data Layer for creating, reading, updating, deleting data or for being notified about data changes.

The SDL can be seen as a distributed data storage system in a Cloud for Telco environment, also including a service of notification to applications upon modification of data.

Although embodiments of the invention will be described more particularly for the SDL case, embodiments of the invention are not limited to the SDL case, and generally apply to access to services provided by a distributed data storage system.

Access to services provided by a distributed data storage such as the SDL may involve:

entities referred to hereafter as client application (or client, or client VNF as illustrated in FIGS. 2 to 4), accessing to these services, entities referred to hereafter as service endpoint (or endpoint, or access point), via which client applications access to these services. The service endpoint refers to the connection to a node within the SDL that is providing access to storage or notification service. It can be considered as a proxy to the Data Base Storage node.

Client applications may communicate with service endpoints at application level using protocols such as LDAP, RESP, CQL, SOAP . . . .

Client applications may store their data in one or multiple local or remote storage nodes in the SDL.

Current state of the art fails to provide an optimized solution for access to services provided by the SDL, at least for the following reasons:

No solution is currently standardized (e.g. in the standardized 3GPP User Data Convergence architecture) to allow client applications to discover the available end points for storage and notifications services, and be updated when new end-points are added or existing end-points are removed, as function of dynamic network topology (e.g. scale-in/scale-out operations in the cloud).

Besides, existing solutions do not permit to take in account the telco constraint for 5G and reliability, e.g.:
  Low latency between the client and the storage to meet the ultra low latency requirement in 5G environment.
  Redundancy level to avoid/limit impact on traffic in case of site crash of access point, site or lost of access to a region.
  The traffic level requested by the client.

In existing solutions, scale-in/scale-out service is not offered: need external application like service discovery to update DNS records. In case of:
  Scale in: Clients will be only notified when connection will be closed
  Scale out: only new client that will access to DNS will take benefit of the new configuration.

Scale-in may be defined as an operation (manual or automatic following metrics analysis) that suppresses an endpoint from the SDL configuration.

Scale-out may be defined as an operation (manual or automatic following metrics analysis) that adds an endpoint to the SDL configuration.

Embodiments of the present invention in particular allow to overcome such deficiencies.

In some embodiments, it is proposed to allow one or more of:
  allow client applications of SDL to discover (i.e. be assigned by SDL) end-point accesses to storage service and notification service, taking into account load distribution in the SDL and specific application performance constraints (e.g. latency constraint for 5G).
  allow client applications to request the SDL to provide redundancy of their data across multiple local and/or remote access nodes;
  enable the SDL to inform client applications of the need of reconfiguration (e.g. addition or removal of endpoint accesses) in function of the dynamically evolving network topology (e.g. scale-in/scale-out operations in the cloud) and the load evolution within the SDL (e.g. overload situation) taking in account the high constraint of reliability in telco environment.

In some embodiments, new procedures between client applications and the SDL are proposed to be introduced.

In some embodiments:

The Shared Data Layer (SDL) may comprise an entity (also called hereafter Service Discovery Function, or Service Discovery, or VNFC Service Discovery as illustrated in FIGS. 2 to 4) providing a service discovery functionality for access to services (storage and notification services) provided by the SDL. The Service Discovery may allows a client application to register to the SDL to discover the endpoints within the SDL supporting a particular service (e.g. data storage or subscription to notification service).

In such registration procedure, the client may provide information regarding one or more of: its localization, its traffic level, and data redundancy requirements, that allow the Service Discovery of the SDL to assign the most optimal access points to the application, balancing the load on the different access points and taking in account the application latency and redundancy requirements.

In some embodiments, a Network Function of the 5G network may indicate whether it wants to access the data locally and remotely. So, this allows data (e.g. context data) to be exchanged across Network Functions irrespective of whether they are located close to each other or remotely from each other.

In addition the SDL Service Discovery may enable the SDL to update the client applications when there is a need for reconfiguration of the access points assigned to the applications.

In some embodiments:
  The client may send to the Service Discovery information related to one or more of: its localization, the traffic level requested and the redundancy level.
  The SDL Service Discovery may leverage this information in one or more of the following ways:
    The localization may permit to provide access point close to the client application and thus a response time in line with the response time constraint of the application, e.g. for 5G.
    The traffic level requested may permit to estimate the number of access point in the database that must be allocated to the client and to better share the load of all the application clients across the SDL access points. This may also be used to anticipate the triggering of scale-out operations.
    the data access level (local and remote).

In some embodiments:
  The Service Discovery functionality may permit at least one of:
    to alert the client that a VM will be shut down and provide new access point.
    To notify the client in case of required rebalancing due to exceed load.

Examples of new procedures introduced according to embodiments of the invention, are illustrated in a simplified way in FIGS. 2, 3, 4.

1) Workflow for Client Registration and SDL Endpoint Discovery

Part or all of following steps (illustrated in FIG. 2) may be provided:
  1—Client may register to Service Discovery. Client may send a Register request including one or more of following information or client characteristics: identity, Client type (e.g. Network Function type, such as HSS, MME, . . . etc.), locality, requested endpoints description (e.g. protocol used), traffic qualification (e.g. real-time, provisioning, . . . etc.), local and remote strategy redundancy, . . . etc. Service Discovery may memorize such Client information.
  2—Service Discovery may allocate client UUID (Universal Unique Identifier), and may calculate best endpoints allocation taking into account latency (optimize response time, strong requirement 5G deployment), redundancy model (reliability) and endpoint load 3—Service Discovery may return UUID, to be used for further Client requests, 4—Client may request allocated endpoints 5—Service Discovery may return the list of allocated endpoints with connection data (e.g. IP address, port, protocol) for each of them, e.g. endpoints i and j 6 & 7: client may connect to allocated endpoints 2) Workflow for Endpoint Scale-In: Alert of Shut Down to Avoid Impact on Traffic (Smooth Operation)

Part or all of following steps (illustrated in FIG. 3) may be provided:

1—Service Discovery may be aware of topology change with endpoint i scale-in and may re-calculate best endpoints allocation taking into account endpoint i scale-in, latency, redundancy model and endpoint load and Client information memorized at client registration. E.g., Endpoint k may be allocated to Client 2—Service Discovery may notify Client of topology change in anticipation before the endpoint is suppressed to avoid impacts on QoS (Quality of Service)

3—Client may request allocated endpoints

4—Service Discovery may return the list of allocated endpoints with connection data for each of them 5—Client may connect to new endpoint k before disconnecting from endpoint i to avoid impacts on QoS 6—Client may disconnect from endpoint i 7—endpoint i can be suppressed from SDL configuration 3) Workflow for Endpoint Scale-Out: Redistribution of Traffic Part or all of following steps (illustrated in FIG. 4) may be provided:

1—Following scale out due to extension capacity (overload/optimization), Service Discovery may be aware of topology change, e.g. with endpoint k scale-out, and may re-calculate best endpoints allocation taking into account new endpoint k, latency, redundancy model and endpoint load. E.g., endpoint k may be allocated to client in addition to already allocated endpoints, to avoid impacts on QoS for that Client.

2—Service Discovery may notify Client of topology change

3—Client may request allocated endpoints

4—Service Discovery may return the list of allocated endpoints with new endpoint k 5—Client may redistribute traffic and connect to the new endpoint k, in addition to connections on already allocated endpoints.

Various aspects and/or embodiments of the invention include (though not being limited to) following aspects and/or embodiments.

Some aspects are related to an entity referred to as Client.

Various embodiments are provided, including (though not being limited to) following embodiments, which may be taken alone or in combination, according to various combinations.

In an embodiment, the entity is configured to:

support access to services provided by a distributed data storage system, via at least one service end point allocated to the Client by an entity referred to as Service Discovery Function based on at least one of: Client requirements, and conditions at the distributed data storage system.

In an embodiment:

the distributed data storage system includes a Data Layer of a communication network such as 5G network.

In an embodiment:

said services include at least one of: create, read, modify, delete data, subscribe to notification of data modification, receive notification of data modification.

In an embodiment:

Client requirements include at least one of:

location of the Client, performances required by the Client, access redundancy level required by the Client.

In an embodiment:

conditions at the distributed data storage system include at least one of:

load conditions, configuration conditions.

In an embodiment, the entity is configured to:

indicate to the Service Discovery Function, if data needs to be stored locally and/or if data needs to be stored remotely.

In an embodiment, the entity is configured to:

indicate its requirements to the Service Discovery Function during a procedure for registration for service end point discovery.

In an embodiment, the entity is configured to:

send to the Service Discovery Function a request for service endpoint allocation.

In an embodiment, the entity is configured to:

provide in a request for service endpoint allocation sent to the Service Discovery Function, identification information received from the Service Discovery Function during a procedure for registration for service endpoint discovery.

In an embodiment, the entity is configured to perform at least one of:

receive from the Service Discovery Function a notification in anticipation before an already allocated service endpoint is suppressed, upon reception of a notification from the Service Discovery Function, send to the Service Discovery Function a new request for service endpoint allocation, connect to a new allocated service endpoint before disconnecting from an already allocated service endpoint.

In an embodiment, the entity is configured to perform at least one of:

receive from the Service Discovery Function a notification indicating need of allocation of a new service endpoint in addition to already allocated endpoints, upon reception of a notification from the Service Discover Function, send to the Service Discovery Function a new request for service endpoint allocation, connect to a new allocated endpoint, in addition to connection to already allocated service endpoints.

Other aspects are related to an entity referred to as Service Discover Function.

Various embodiments are provided, including (though not being limited to) following embodiments, which may be taken alone or in combination, according to various combinations.

In an embodiment, the entity is configured to:

support access by an entity referred to as Client, to services provided by a distributed data storage system, via at least one service end point allocated to the Client by the Service Discovery Function based on at least one of: Client requirements, and conditions at the distributed data storage system.

In an embodiment:

the distributed data storage system includes a Data Layer of a communication network such as 5G network.

In an embodiment:

said services include at least one of: create, read, modify, delete data, subscribe to notification of data modification, receive notification of data modification.

In an embodiment:
Client requirements include at least one of:
location of the Client,
performances required by the Client,
data redundancy level required by the Client.

In an embodiment:
conditions at the distributed data storage system include at least one of:
load conditions,
configuration conditions.

In an embodiment, the entity is configured to:
receive from the Client an indication if data needs to be stored locally and/or if data needs to be stored remotely.

In an embodiment, the entity is configured to:
receive Client requirements during a procedure for registration for service end point discovery.

In an embodiment, the entity is configured to:
memorize information received from the Client during a procedure for registration for service end point discovery.

In an embodiment, the entity is configured to:
receive from the Client a request for service endpoint allocation.

In an embodiment, the entity is configured to:
receive from the Client, in a request for service endpoint allocation, identification information sent to the Client during a procedure for registration for service endpoint discovery.

In an embodiment, the entity is configured to perform at least one of:
send to the Client a notification in anticipation before an already allocated service endpoint is suppressed,
receive from the Client a new request for service point allocation,
allocate at least one new service endpoint, upon new request for service endpoint allocation from the Client.

In an embodiment, the entity is configured to perform at least one of:
send to the Client a notification indicating need of allocation of a new service endpoint in addition to already allocated endpoints,
receive from the Client a new request for service endpoint allocation,
allocate at least one new service endpoint, upon new request for service endpoint allocation from the Client.

Other aspects are related to method(s) for access to services provided by a distributed data storage system, comprising at least one step performed by at least one of the thus configured entities, such as (although not limited to) entity referred to as Client and entity referred to as Discovery Function.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising:
at least one processor; and
at least one memory including computer program code, the at least one memory and the computer program code configured to, with the at least one processor, cause the apparatus at least to:
provide functions of a core network control plane function, said functions including access to services provided by a distributed data storage system, said data stored in said distributed data storage system including at least one of mobility management data, session management data, subscriber data, or policy data, said services provided by said distributed data storage system including at least one of create data, delete data, update data, subscribe to notification of data modification, or receive notification of data modification;
acting as a client function, send, to a service discovery function, a request for allocation of at least one service end point via which to access to services provided by said distributed data storage system, and receive, from said service discovery function, information associated with at least one allocated service endpoint, wherein said allocation is based on at least one of: client function requirements, or conditions at the distributed data storage system.

2. An apparatus according to claim 1, wherein:
client function requirements include at least one of:
location of the client function,
performances required by the client function, or
access redundancy level required by the client function.

3. An apparatus according to claim 1, wherein:
conditions at the distributed data storage system include at least one of:
load conditions, or
configuration conditions.

4. An apparatus according to claim 1, wherein the at least one memory and the computer program code are configured to, with the at least one processor, cause the apparatus to:
indicate to the service discovery function, if data needs to be stored locally and/or if data needs to be stored remotely.

5. An apparatus according to claim 1, wherein the at least one memory and the computer program code are configured to, with the at least one processor, cause the apparatus to:
indicate its requirements to the service discovery function during a procedure for registration for service end point discovery.

6. An apparatus according to claim 1, wherein the at least one memory and the computer program code are configured to, with the at least one processor, cause the apparatus to:
provide in a request for service endpoint allocation sent to the service discovery function, identification information received from the service discovery function during a procedure for registration for service endpoint discovery.

7. An apparatus according to claim 1, wherein the at least one memory and the computer program code are configured to, with the at least one processor, cause the apparatus to perform at least one of:
receive from the service discovery function a notification in anticipation before an already allocated service endpoint is suppressed,
upon reception of a notification from the service discovery function, send to the service discovery function a new request for service endpoint allocation, or connect to a new allocated service endpoint before disconnecting from an already allocated service endpoint.

8. An apparatus according to claim 1, wherein the at least one memory and the computer program code are configured to, with the at least one processor, cause the apparatus to perform at least one of:
receive from the service discovery function a notification indicating need of allocation of a new service endpoint in addition to already allocated endpoints,
upon reception of a notification from the service discovery function, send to the service discovery function a new request for service endpoint allocation, or
connect to a new allocated endpoint, in addition to connection to already allocated service endpoints.

9. The apparatus according to claim 1, wherein the information associated with the at least one service endpoint comprises internet protocol address information.

10. The apparatus according to claim 1, wherein said client function requirements are contained in said request.

11. An apparatus comprising:
at least one processor; and
at least one memory including computer program code,
the at least one memory and the computer program code configured to, with the at least one processor, cause the apparatus at least to:
provide functions of a service discovery function, including:
receiving from a core network control plane function acting as a client function, a request for allocation of at least one service end point via which to access to services provided by a distributed data storage system, said data stored in said distributed data storage system including at least one of mobility management data, session management data, subscriber data, or policy data, said services provided by said distributed data storage system including at least one of create data, delete data, update data, subscribe to notification of data modification, or receive notification of data modification, and sending to said client function information associated with at least one allocated service endpoint, wherein said allocation is based on at least one of: client function requirements, or conditions at the distributed data storage system.

12. An apparatus according to claim 11, wherein:
client function requirements include at least one of:
location of the client function,
performances required by the client function, or
data redundancy level required by the client function.

13. An apparatus according to claim 11, wherein:
conditions at the distributed data storage system include at least one of:
load conditions, or
configuration conditions.

14. An apparatus according to claim 11, wherein the at least one memory and the computer program code are configured to, with the at least one processor, cause the apparatus to:
receive from the client function an indication if data needs to be stored locally and/or if data needs to be stored remotely.

15. An apparatus according to claim 11, wherein the at least one memory and the computer program code are configured to, with the at least one processor, cause the apparatus to:
receive client function requirements during a procedure for registration for service end point discovery.

16. An apparatus according to claim 11, wherein the at least one memory and the computer program code are configured to, with the at least one processor, cause the apparatus to:
memorize information received from the client function during a procedure for registration for service end point discovery.

17. An apparatus according to claim 11, wherein the at least one memory and the computer program code are configured to, with the at least one processor, cause the apparatus to:
receive from the client function, in a request for service endpoint allocation, identification information sent to the client function during a procedure for registration for service endpoint discovery.

18. An apparatus according to claim 11, wherein the at least one memory and the computer program code are configured to, with the at least one processor, cause the apparatus to perform at least one of:
send to the client function a notification in anticipation before an already allocated service endpoint is suppressed,
receive from the client function a new request for service point allocation, or
allocate at least one new service endpoint, upon the new request for service endpoint allocation from the client function.

19. An apparatus according to claim 11, wherein the at least one memory and the computer program code are configured to, with the at least one processor, cause the apparatus to perform at least one of:
send to the client function a notification indicating need of allocation of a new service endpoint in addition to already allocated endpoints,
receive from the client function a new request for service endpoint allocation, or
allocate at least one new service endpoint, upon the new request for service endpoint allocation from the client function.

20. The apparatus according to claim 11, wherein the information associated with the at least one service endpoint comprises internet protocol address information.

21. The apparatus according to claim 11, wherein said client function requirements are contained in said request.

22. A method comprising:
providing functions of a core network control plane function, said functions including access to services provided by a distributed data storage system, said data stored in said distributed data storage system including at least one of mobility management data, session management data, subscriber data, or policy data, said services provided by said distributed data storage system including at least one of create data, delete data, update data, subscribe to notification of data modification, or receive notification of data modification; and
acting as a client function, sending to a service discovery function a request for allocation of at least one service end point via which to access to services provided by said distributed data storage system, and receiving from said service discovery function information associated with at least one allocated service endpoint, wherein said allocation is based on at least one of: client function requirements, or conditions at the distributed data storage system.

23. A method comprising:
providing functions of a service discovery function, including:

receiving from a core network control plane function acting as a client function, a request for allocation of at least one service end point via which to access to services provided by a distributed data storage system, said data stored in said distributed data storage system including at least one of mobility management data, session management data, subscriber data, or policy data, said services provided by said distributed data storage system including at least one of create data, delete data, update data, subscribe to notification of data modification, or receive notification of data modification, and sending to said client function information associated with at least one allocated service endpoint, wherein said allocation is based on at least one of: client function requirements, or conditions at the distributed data storage system.

* * * * *